(12) United States Patent
Harada et al.

(10) Patent No.: US 9,509,006 B2
(45) Date of Patent: Nov. 29, 2016

(54) FUEL CELL SYSTEM

(75) Inventors: Terumaru Harada, Nara (JP); Akinari Nakamura, Osaka (JP); Yoshikazu Tanaka, Osaka (JP); Masataka Ozeki, Osaka (JP); Hideo Ohara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 486 days.

(21) Appl. No.: 13/309,288

(22) Filed: Dec. 1, 2011

(65) Prior Publication Data

US 2012/0077101 A1 Mar. 29, 2012

Related U.S. Application Data

(63) Continuation of application No. 11/884,386, filed as application No. PCT/JP2006/302479 on Feb. 13, 2006, now abandoned.

(30) Foreign Application Priority Data

Feb. 18, 2005 (JP) ................................. 2005-043129

(51) Int. Cl.
*H01M 8/06* (2016.01)
*C01B 3/38* (2006.01)
*H01M 8/04* (2016.01)

(52) U.S. Cl.
CPC ............ *H01M 8/0668* (2013.01); *C01B 3/384* (2013.01); *H01M 8/04268* (2013.01); *H01M 8/04753* (2013.01); *H01M 8/0618* (2013.01); *C01B 2203/0233* (2013.01); *C01B 2203/066* (2013.01); *C01B 2203/0811* (2013.01); *C01B 2203/0822* (2013.01); *C01B 2203/0827* (2013.01); *C01B 2203/1241* (2013.01); *C01B 2203/1604* (2013.01); *C01B 2203/1619* (2013.01); *C01B 2203/1695* (2013.01); *Y02E 60/50* (2013.01); *Y02P 20/128* (2015.11)

(58) Field of Classification Search
CPC ......... B01J 19/0013; H01M 8/04223; H01M 8/04268; H01M 8/04753; H01M 8/0618; H01M 8/0668; C01B 3/384; C01B 2203/066; C01B 2203/0811; C01B 2203/0822; C01B 2203/0827; C01B 2203/1241; C01B 2203/1604; C01B 2203/1619; C01B 2203/1695; C01B 2203/0233; Y02P 20/128; Y02E 60/50
USPC ................................... 429/423; 422/625–628
See application file for complete search history.

(56) References Cited

U.S. PATENT DOCUMENTS 4,171,637 A * 10/1979 Blanke ....................... 73/114.71
2003/0104711 A1* 6/2003 Nakamura et al. ............. 439/19
(Continued)

FOREIGN PATENT DOCUMENTS

JP 63-29460 2/1988
JP 6-333587 12/1994
(Continued)

OTHER PUBLICATIONS

Machine Translation of JP 2003-229149.*
Industrial Controls: http://www.industrialcontrolsonline.com/training/online/everything-you-need-know-about-combustion-chemistry-analysis.*

*Primary Examiner* — Milton I Cano
*Assistant Examiner* — Stephen Yanchuk
(74) *Attorney, Agent, or Firm* — McDermott Will & Emery LLP

(57) ABSTRACT

A fuel cell system (100) comprising: a fuel cell (1) for generating electric power using a fuel gas; a fuel gas generator section (2) for generating the fuel gas using a raw material gas; a combustor section (2a) for generating heat energy to be used for generating the fuel gas; an air feeder section (2b) for feeding aft when the heat energy is generated; and a controller section (101); wherein the fuel cell is filled with the raw material gas before the fuel gas is fed, and wherein the controller section (101) performs a control operation such that the feed rate of air supplied from the air feeder section (2b) to the combustor section (2a) increases when the fuel gas generated in the fuel gas generator section (2) is supplied to the fuel cell (1).

12 Claims, 4 Drawing Sheets

(56) References Cited

U.S. PATENT DOCUMENTS

| | | | |
|---|---|---|---|
| 2003/0198842 A1* | 10/2003 | Nishida et al. | 429/19 |
| 2005/0064252 A1* | 3/2005 | Kusakabe et al. | 429/13 |
| 2005/0175532 A1* | 8/2005 | Iio et al. | 423/652 |
| 2005/0227129 A1* | 10/2005 | Iio | 429/20 |

FOREIGN PATENT DOCUMENTS

| | | | |
|---|---|---|---|
| JP | 7-267604 | | 10/1995 |
| JP | 2001-165431 | | 6/2001 |
| JP | 2001-176528 | | 6/2001 |
| JP | 2003-229149 | | 8/2003 |
| JP | 2003-229156 | | 8/2003 |
| JP | 2003-229149 | * | 9/2003 |
| JP | 2003-288921 | | 10/2003 |
| JP | 2004-196600 | | 7/2004 |
| JP | 2004-199977 | | 7/2004 |
| JP | 2004-296235 | | 10/2004 |
| JP | 2005-228621 | | 8/2005 |

* cited by examiner

FUEL CELL SYSTEM

RELATED APPLICATIONS

This application is a Continuation of U.S. application Ser. No. 11/884,386, filed on Aug. 15, 2007, now abandoned, which is the U.S. National Phase under 35 U.S.C. §371 of International Application No. PCT/JP2006/302479, filed on Feb. 13, 2006, which in turn claims the benefit of Japanese Application No. 2005-043129, filed on Feb. 18, 2005, the disclosures of which Applications are incorporated by reference herein.

TECHNICAL FIELD

The present invention relates to a fuel cell system for generating electric power by use of hydrogen and oxygen. More particularly, the invention relates to a fuel cell system that uses, as a fuel for power generation, hydrogen generated from raw material making use of the combustion heat of an inflammable material.

BACKGROUND ART

Fuel cell systems capable of high-efficiency small-scale power generation have been and are being developed as a distributed power generation system having high energy utilization efficiency, because they have a system for utilizing heat energy generated during power generation which is easy to construct.

Fuel cell systems have a fuel cell as the main body of the power generation section. In this fuel cell, the chemical energy of fuel gas and oxidizing gas is directly converted into electric energy through a specified electrochemical reaction. Therefore, fuel cell systems are configured to supply fuel gas and oxidizing gas to the fuel cell during power generating operation. In the fuel cell, the specified electrochemical reaction, which uses the supplied fuel gas and oxidizing gas, proceeds so that electric energy is generated. The electric energy generated in the fuel cell is supplied from the fuel cell system to the load. Generally, fuel cell systems have a reformer and a blower. In the reformer, hydrogen-rich fuel gas is generated through the steam reforming reaction that uses water and raw material such as natural gas. This fuel gas is supplied to the fuel cell as a fuel for power generation. The steam reforming reaction proceeds with a reforming catalyst provided in the reformer being burnt by, e.g., a combustion burner. The blower draws air from the atmosphere. This air is supplied to the fuel cell as the oxidizing gas for power generation.

In a known fuel cell system, the supply of the raw material such as natural gas to the reformer is stopped when stopping power generating operation. Thereby, the supply of the fuel gas from the reformer to the fuel cell is stopped so that the progress of the electrochemical reaction within the fuel cell stops and, in consequence, the supply of electric power from the fuel cell system to the load stops. When the supply of the raw material to the reformer is stopped, the fuel gas generated before the stop stays within the fuel cell and its neighboring part during a period of time when the power generation is stopped. In this case, if air comes from the combustion burner opened to the atmosphere and gets mixed in with the dwelling fuel gas owing to natural convection, the hydrogen contained in the fuel gas is rapidly oxidized by oxygen contained in air so that the reaction heat accompanying the oxidizing reaction may damage the fuel cell system.

Therefore, the known fuel cell system is configured such that, in order to prevent the fuel gas from staying within the fuel cell system, inert gas such as nitrogen gas is fed to the path in which the fuel gas is staying during a power generation stop period to force out the fuel gas which is in turn combusted by a combustion burner. With this arrangement, the stay of the fuel gas within the fuel cell during the power generation stop period can be prevented so that rapid oxidation of the hydrogen contained in the fuel gas can be avoided. As a result, a fuel cell system, which assures security, can be obtained.

However, in the known fuel cell system, an inert gas feeding means such as a nitrogen gas cylinder has to be installed within or near the fuel cell system to replace the dwelling fuel gas with the inert gas such as nitrogen gas. Therefore, the known fuel cell system is large in size and difficult to use as a fixed-type distributed power generation system for household use or a power source for electric vehicles. In addition, the means for feeding inert gas such as nitrogen gas has to be provided in addition to the existing components, which increases the initial cost of the fuel cell system. Furthermore, the known fuel cell system is required to periodically replace or replenish the inert gas feeding means such as a nitrogen gas cylinder, so that the running cost of the fuel cell system increases.

In the known fuel cell system, the fuel gas containing high concentrations of carbon monoxide is fed from the reformer to the fuel cell just after starting power generating operation. The reason for this is that carbon monoxide contained in the fuel gas is not thoroughly removed because the operating temperature of the reformer has not reached a specified value at a start of power generating operation. Therefore, if the fuel gas containing high concentrations of carbon monoxide is fed to, for example, a solid polymer electrolyte fuel cell, the catalyst of the fuel electrode of the solid polymer electrolyte fuel cell is contaminated (poisoned) with the carbon monoxide supplied. The poisoning of the catalyst of the fuel electrode significantly hampers the progress of the electrochemical reaction within the fuel cell. Therefore, the known fuel cell system has presented the problem that the power generation performance of the fuel cell deteriorates depending on the number of stops and starts of power generating operation.

As an attempt to solve the above problems, there has been proposed a fuel cell system that is usable for household purposes and electric vehicles and the catalyst of which is unsusceptible to poisoning (e.g., Patent Document 1). According to this system, feeding of the fuel gas to the fuel cell is stopped just after starting power generating operation and the fuel gas serving as a raw material is injected into the fuel cell as a displacement gas after stopping power generating operation.

The above proposed fuel cell system has a reformer for generating hydrogen-rich fuel gas from a raw material containing, as a chief component, a compound of carbon and hydrogen; a fuel gas feed passage for feeding the fuel gas from the reformer to a fuel cell; an off gas feed passage for feeding the fuel gas, which has been discharged from the fuel cell without being used for power generation (hereinafter referred to as "off gas"), to a combustion burner of the reformer; and a first bypass passage provided between the fuel gas feed passage and the off gas feed passage, for switching the destination of the fuel gas from the fuel cell to the combustion burner of the reformer. In addition, the fuel cell system includes a raw material feeder for feeding a raw material to the reformer to generate the fuel gas and a second bypass passage that extends from the raw material feeder to the fuel cell bypassing the reformer to directly send the raw material to the fuel cell.

In the proposed fuel cell system, just after starting power generating operation, the fuel gas containing high concentrations of carbon monoxide and generated in the reformer is fed to the combustion burner of the reformer by way of the first bypass passage. In the combustion burner, the fuel gas is combusted to heat the reforming catalyst. After the temperature of the reforming catalyst in the reformer has reached a specified temperature after starting power generating operation, the fuel gas generated in the reformer is fed to the fuel cell via the fuel gas feed passage. In the fuel cell, the fuel gas is used as a fuel for power generation. The off gas discharged from the fuel cell is fed to the combustion burner of the reformer via the off gas feed passage. In the combustion burner, the off gas is combusted for heating the reforming catalyst.

In the proposed fuel cell system, after stopping the power generating operation of the fuel cell system, a raw material is injected as a displacement gas from the raw material feeder into a fuel gas flow path of the fuel cell through a second bypass passage. Thereby, the inside and neighboring area of the fuel cell are sealed off by the raw material such as natural gas in place of the inert gas such as nitrogen gas over a period of time when the power generating operation of the fuel cell system is stopped.

According to the above fuel cell system, since the raw material is injected as a displacement gas into the fuel cell from the raw material feeder that is originally provided, after stopping power generating operation, it is no longer necessary to dispose an inert gas feeding means such as a nitrogen gas cylinder within or in the neighborhood of the fuel cell system. Accordingly, the fuel cell system is not increased in size and therefore can be used as a fixed-type distributed power generation system for household use or a power source for electric vehicles. In addition, since there is no need to provide an inert gas feeding means such as a nitrogen gas cylinder in addition to the original components, the initial cost of the fuel cell system can be kept low. Furthermore, there is no need to periodically replace an inert gas feeding means such as a nitrogen gas cylinder, which leads to a reduction in the running const of the fuel cell system.

The raw material such as natural gas injected from the raw material feeder into the fuel cell is more chemically stable compared to the hydrogen contained in the fuel gas. Therefore, no rapid oxidation reaction will proceed even if air is mixed in with the raw material such as natural gas dwelling within the fuel cell during a power generation stop period. Therefore, the fuel cell system can be effectively prevented from being damaged by the reaction heat of oxidation reaction by injecting the raw material such as natural gas into the fuel cell. As a result, the proposed fuel cell system can assure security during the power generation stop period.

Further, according to the proposed fuel cell system, fuel gas containing high concentrations of carbon monoxide is not supplied to the fuel cell just after starting power generating operation, but fuel gas is fed from the reformer to the fuel cell after the temperature of the reforming catalyst of the reformer reaches a specified value and fuel gas containing a sufficiently reduced concentration of carbon monoxide is generated. Therefore, the poisoning of the catalyst of the fuel electrode in the solid polymer electrolyte fuel cell be prevented. Since the factor for impeding the progress of the electrochemical reaction within the fuel cell is thus eliminated, it is possible to solve the problem that the power generating performance of the fuel cell deteriorates depending on the number of stops and stars of power generating operation.

Patent Document 1: Japanese Patent Application Laid-Open Publication No. 2003-229149

DISCLOSURE OF THE INVENTION

Problems that the Invention is to Solve

The above-described known system has, however, revealed the following problem. After the temperature of the reforming catalyst of the reformer has reached a specified value and the reformer has started feeding of the fuel gas from the reformer to the fuel cell, the raw material such as natural gas injected into the fuel cell from the raw material feeder after stopping power generating operation is forced out from the fuel cell by the fuel gas fed from the reformer and sent to the combustion burner of the reformer for a specified period of time, so that a shortage of oxygen and, in consequence, imperfect combustion are caused in the combustion burner and carbon monoxide is discharged to the atmosphere during this specified period.

More concretely, the combustion burner of the reformer basically combusts hydrogen contained in the off gas in order to promote the steam reforming reaction. At that time, air is supplied from the combustion fan disposed adjacent to the combustion burner in an amount corresponding to the feed amount of hydrogen, in order to perfectly combust the hydrogen.

On the other hand, after the temperature of the reforming catalyst of the reformer has reached a specified level and feeding of the fuel gas from the reformer to the fuel cell has started, the raw material such as natural gas discharged from the fuel cell is supplied to the combustion burner as described earlier for a specified period of time. For perfect combustion of the natural gas, air in a larger amount than required for perfect combustion of the hydrogen becomes necessary. However, the feed amount of air supplied from the combustion fan to the combustion burner is equal to the feed amount required for perfect combustion of the hydrogen as stated above. Therefore, a shortage of oxygen occurs in the combustion burner for the specified period of time and, in consequence, imperfect combustion of the natural gas progresses. As a result, the combustion burner discharges carbon monoxide.

As described above, the above known fuel cell system discharges carbon monoxide into the atmosphere for a specified period of time after starting feeding of the fuel gas from the reformer to the fuel cell when starting power generating operation. It is well known that carbon monoxide is toxic to human body. For instance, carbon monoxide combines with hemoglobin contained in blood, generating carbonyl hemoglobin which significantly impairs the oxygen carrying function of hemoglobin. Therefore, if such a fuel cell system comes into wide use and large amounts of carbon monoxide are discharged into the atmosphere, it will present a danger to public health.

The present invention is directed to overcoming the foregoing problems and a primary object of the invention is therefore to provide an environmentally friendly fuel cell system that can effectively restrain the emissions of carbon monoxide at a start of power generating operation with a simple structure and therefore reduces adverse effects upon ecosystems.

The above problems can be solved by the following method of operating a fuel cell system. The method is performed between two sequential stop operations. In the method of operating a fuel cell system, combustion by using a hydrogen-containing fuel gas supplied from a fuel gas generator to a combustor through a bypass passage and air supplied from an air feeder to the combustor is performed. The fuel gas generator generates the hydrogen-containing fuel gas by reforming a raw material gas through a reforming reaction. The bypass passage connects a fuel gas passage, through which the hydrogen-containing fuel gas from the fuel gas generator is supplied to a fuel cell, to an off gas passage through which a redundant fuel gas from the fuel cell is supplied to the combustor. Destination of the hydrogen-containing fuel gas generated in the fuel generator is switched from the bypass passage to the fuel cell during performing the combustion. The fuel cell is filled with the raw material gas before the switching the destination. Combustion by using the raw material gas supplied from the fuel cell to the combustor is performed after the switching the destination. A feed rate of air supplied from the air feeder to the combustor is increased, when switching the destination, such that the feed rate of air supplied from the air feeder to the combustor immediately after the switching becomes higher than the feed rate of air supplied from the air feeder to the combustor before the switching.

In the above method of operating a fuel cell system wherein the fuel cell is filled with the raw material gas before the fuel gas generated in the fuel gas generator section is supplied to the fuel cell instead of the bypass passage, since a sufficient amount of air is supplied from the air feeder section to the combustor section, the emissions of carbon monoxide from the fuel cell system at a start of power generation can be restrained.

Effects Of The Invention

According to the embodiments of the invention, environmentally friendly fuel cell systems are provided which are capable of effectively restraining the emissions of carbon monoxide with a simple structure at a start of power generating operation to reduce adverse effects upon ecosystems.

BRIEF EXPLANATION OF THE DRAWINGS

FIG. 3 is pattern diagrams diagrammatically showing changes in the feed rate of air supplied from a combustion fan to a combustion burner, wherein

EXPLANATION OF REFERENCE NUMERALS

Figure 1:
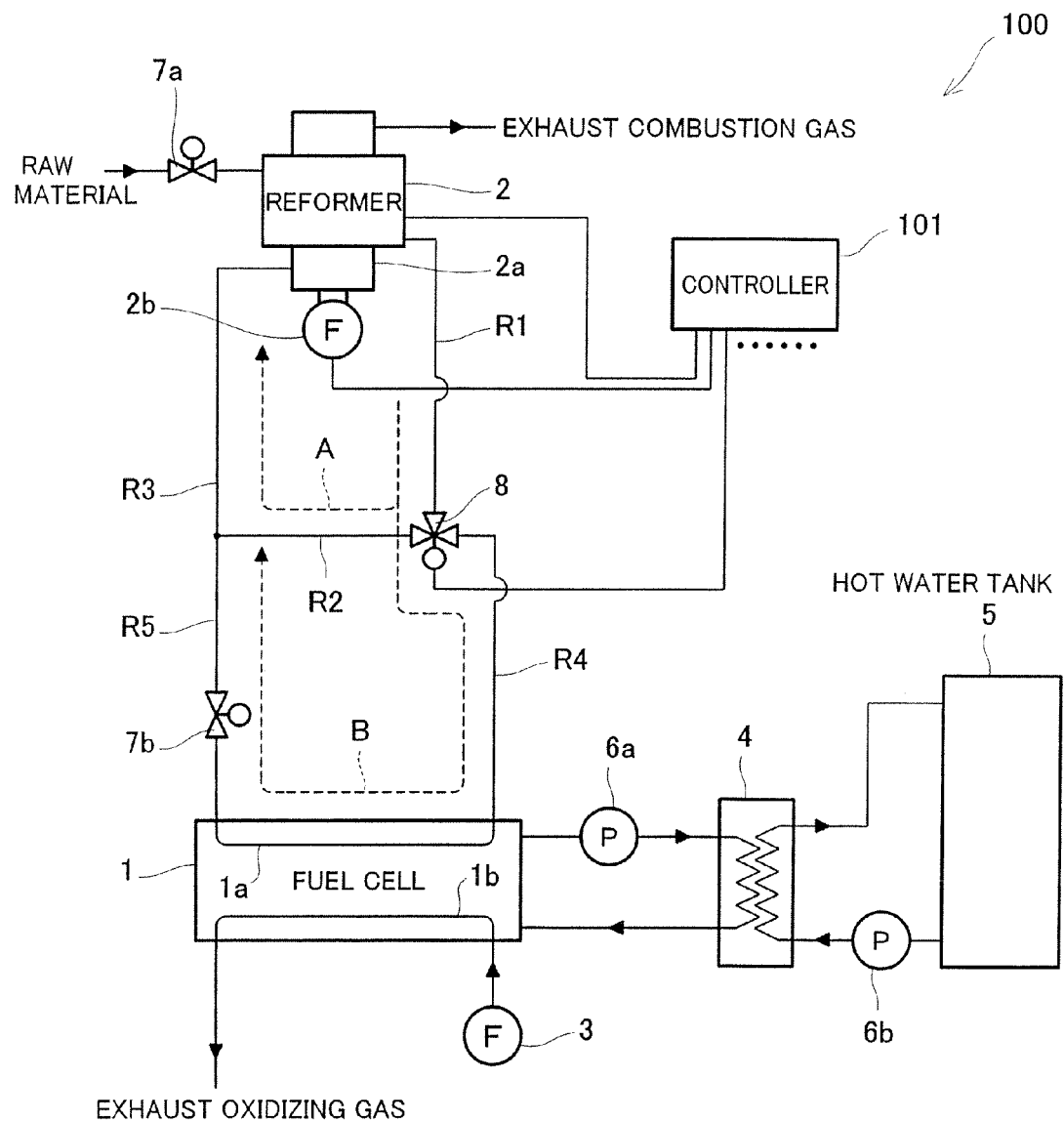
FIG. 1 is a block diagram diagrammatically showing the structure of a fuel cell system according to a first embodiment of the invention.

1: fuel cell
1a: fuel gas flow path
1b: oxidizing gas flow path
2: reformer
2a: combustion burner
2b: combustion fan
3: blower
4: heat exchanger
5: hot water tank
6a, 6b: pump
7a, 7b: shutoff valve
8: three-way valve
9: CO sensor
100-200: fuel cell system
101: controller
R1: first route
R2: second route
R3: third route
R4: fourth route
R5: fifth route
A: first fuel gas passage
B: second fuel gas passage

BEST MODE FOR CARRYING OUT THE INVENTION

Referring now to the accompanying drawings, the best mode for carrying out the invention will be described in detail.

(First Embodiment)

First, the structure of a fuel cell system according to a first embodiment of the invention will be described.

FIG. 1 is a block diagram diagrammatically showing the structure of a fuel cell system according to the first embodiment of the invention. It should be noted that solid lines connecting the elements of the fuel cell system shown in FIG. 1 indicate passages for water, fuel gas, oxidizing gas, electric signals, etc. The arrows of the solid lines indicate the flowing directions of water, fuel gas, oxidizing gas etc. during normal operation. In FIG. 1, only the elements necessary for explaining the invention are shown and an illustration of other elements is omitted.

As shown in FIG. 1, the fuel cell system 100 of the first embodiment has a fuel cell 1 as the main body of the power generation part thereof. As the fuel cell 1, a solid polymer electrolyte fuel cell is used in this embodiment. The fuel cell 1 generates electricity, using hydrogen-rich fuel gas discharged from a reformer (described later) 2 and supplied to a fuel gas flow path 1a provided in the fuel cell 1 and oxidizing gas (which is usually air) fed from a blower 3 (described later) to an oxidizing gas flow path 1b provided in the fuel cell 1, so that a specified quantity of electric power is output. That is, the fuel cell 1 directly converts the chemical energy of the fuel gas and oxidizing gas into electrical energy through a specified electrochemical reaction that proceeds using a specified reaction catalyst. With this energy conversion, the fuel cell 1 feeds electric energy to the load connected to the fuel cell system 100.

In this embodiment, the oxidizing gas to be fed to the oxidizing gas flow path 1b of the fuel cell 1 is brought into a predetermined humidified condition beforehand, by utilizing the moisture of the oxidizing gas after used for the power generation within the fuel cell 1. If the moisture of the oxidizing gas runs short, a part of water stored in the water storage tank (not shown in FIG. 1) is evaporated within the fuel cell 1, thereby adjusting the humidity of the oxidizing gas to a proper value. The fuel gas to be fed to the fuel gas flow path 1a of the fuel cell 1 is brought into a predetermined humidified condition beforehand within the reformer 2 described above.

During the power generation, the fuel cell 1 generates heat owing to a specified electrochemical reaction utilized for the energy conversion. The heat generated in the fuel cell 1 is sequentially recovered by cooling water fed to a cooling water flow path (not shown in FIG. 1) provided in the fuel cell 1. The heat recovered by the cooling water is utilized for heating water fed from a hot water tank 5 (described later) within a heat exchanger 4 (described later).

A detailed description of the internal structure of the fuel cell 1 is omitted herein because it is similar to the internal structure of the general-type solid polymer electrolyte fuel cell.

As shown in FIG. 1, the fuel cell system 100 has the reformer 2 which mainly encourages a steam reforming reaction using a raw material (raw material gas) and water, so that hydrogen-rich fuel gas is produced. The raw material contains an organic compound composed of at least carbon and hydrogen. Examples of the raw material include hydrocarbon-based components such as natural gas (containing methane as a chief component) and LPG; alcohol such as methanol; and naphtha. The supply of the raw material to the reformer 2 is done by a material feeder (not shown in FIG. 1). At that time, the intermittent supply of the raw material to the reformer 2 is done with the aid of a shut-off valve 7a. Although not particularly shown in FIG. 1, the reformer 2 has a reforming section for promoting the steam reforming reaction, and a metamorphosing section and depurating section for reducing carbon monoxide contained in the fuel gas discharged from the reforming section.

The reforming section includes a reforming catalyst (not shown in FIG. 1) for promoting the steam reforming reaction; a combustion burner 2a for combusting off gas mainly discharged from the fuel cell 1 to heat the reforming catalyst; and a combustion fan 2b for feeding air required for the combustion of the off gas in the combustion burner 2a from the atmosphere. The metamorphosing section includes a metaphoric catalyst used for reducing the carbon monoxide concentration of the fuel gas discharged from the reforming section by the reaction between carbon monoxide and water. The depurating section includes a CO removing catalyst for further reducing the carbon monoxide concentration of the fuel gas discharged from the metamorphosing section through an oxidizing reaction or methanation reaction. To effectively reduce the amount of carbon monoxide contained in the fuel gas, the metamorphosing section and the depurating section are respectively operated under temperature conditions suited for the respective chemical reactions proceeding in these sections.

A detailed description of the components of the reformer 2 other than the above-described reforming section, metamorphosing section and depurating section is omitted herein because the internal structure of the reformer 2 is similar to that of the general-type reformer.

As shown in FIG. 1, the fuel cell system 100 has the blower 3. The blower 3 feeds air to the oxidizing gas flow path 1b of the fuel cell 1 as the oxidizing gas by drawing air from the atmosphere. As the blower 3, a sirocco fan or the like is preferably used.

As shown in FIG. 1, the fuel cell system 100 has the heat exchanger 4. The heat exchanger 4 exchanges heat between cooling water that has been discharged from a cooling water flow path (not shown in FIG. 1) of the fuel cell 1 by the operation of a pump 6a and risen in temperature and water fed from the hot water tank 5 (described later) by a pump 6b for the purpose of hot water supply etc. The cooling water cooled by the heat exchange in the heat exchanger 4 is again supplied to the cooling water flow path of the fuel cell 1 by the operation of the pump 6a.

As shown in FIG. 1, the fuel cell system 100 has the hot water tank 5. This hot water tank 5 stores water heated by the heat exchanger 4. The water stored in the hot water tank 5 is circulated through the heat exchanger 4 by the operation of the pump 6b. At that time, the water supplied from the hot water tank 5 is heated in the heat exchanger 4 by the heat of the cooling water which has risen in temperature and has been discharged from the fuel cell 1 by the operation of the pump 6a. The water heated by the heat exchanger 4 is stored in the hot water tank 5. The heated water stored in the hot water tank 5 is used for hot water supply according to need.

As shown in FIG. 1, in the fuel cell system 100, a three-way valve 8 is provided at the junction between a first route R1 and a fourth route R4 for feeding the fuel gas generated by the reformer 2 to the fuel gas flow path 1a of the fuel cell 1. A shutoff valve 7b is provided in a fifth route R5 for feeding the off gas discharged from the fuel gas flow path 1a of the fuel cell 1 to the combustion burner 2a of the reformer 2. A second route R2 (bypass route) is provided between the three-way valve 8 and the junction between the fifth route R5 and the third route R3. This route R2 is for directly supplying the fuel gas generated by the reformer 2 to the combustion burner 2a, bypassing the fuel cell 1. The first to third routes R1, R2, R3 constitute a first fuel gas passage A as shown in FIG. 1. The first route R1, the fourth route R4, the fuel gas flow path 1a, the fifth route R5 and the third route R3 constitute a second fuel gas passage B, as shown in FIG. 1. That is, the fuel cell system 100 of the first embodiment is configured such that the fuel gas discharged from the reformer 2 can be directly supplied to the combustion burner 2a according to need without supplying it to the fuel cell 1, by operating the shutoff valve 7b and the three-way valve 8. In this embodiment, the first and fourth routes R1, R4 constitute a fuel gas passage for supplying the fuel gas generated by the reformer 2 to the fuel gas flow path 1a of the fuel cell 1. Further, in this embodiment, the fifth and third routes R5, R3 constitute an off gas passage for supplying the off gas discharged from the fuel gas flow path 1a of the fuel cell 1 to the combustion burner 2a of the reformer 2.

The fuel cell system 100 further has a controller 101. The controller 101 properly controls the operation of each of the elements that constitute the fuel cell system 100. Although not particularly shown in FIG. 1, the controller 101 includes, for instance, a memory, a timer, a central processing unit (CPU) and others. A program for the operation of each element of the fuel cell system 100 is prestored in the memory of the controller 101, according to which, the controller 101 properly controls the operation of the fuel cell system 100.

Next, the operation of the fuel cell system 100 according to the first embodiment of the invention will be described in detail with reference to the drawings. The following description is made on assumption that during the stop operation period or start-up operation period of the fuel cell system 100, the fuel gas flow path 1a of the fuel cell 1 and its neighboring part are filled with the raw material gas beforehand. This raw material gas (natural gas, which is hydrocarbon gas, is used in this embodiment) contains an organic compound composed of at least carbon and hydrogen and serves as a displacement gas. The filling of the fuel cell 1 etc. with the raw material gas is carried out by supplying the raw material gas from the raw material feeder (not shown in FIG. 1) to the fuel cell 1 etc. In this embodiment, the definition of "the start-up operation period" is the period after a start-up command is released from the controller 101 until electric current is taken out from the fuel cell 1 by a power generation controlling section (not shown in FIG. 1) of the fuel cell 1, whereas the definition of "the stop operation period" is "the period after a stop command is released from the controller 101 until the operation of the whole fuel cell system 100 completely stops".

The fuel control system 100 performs the following operation through the control of the controller 101.

First, when starting the power generating operation of the fuel cell system 100 shown in FIG. 1, the reformer 2 is operated to generate fuel gas containing lots of hydrogen that is necessary for the power generating operation of the fuel cell 1. More concretely, natural gas, which is a raw material for generating hydrogen, is fed from the raw material feeder (not shown in FIG. 1) to the reforming section of the reformer 2. To generate vapor used for promoting the steam reforming reaction, water is fed from the infrastructure such as water line to the reforming section of the reformer 2. To promote the steam reforming reaction in the reforming section of the reformer 2, the reforming catalyst provided in the reforming section is heated by the combustion burner 2a.

At a start of the power generating operation of the fuel cell system 100, the reforming catalyst in the reforming section of the reformer 2 is heated by the combustion burner 2a so that its temperature gradually rises but has not reached a specified value yet. Therefore, the steam reforming reaction in the reforming section does not properly progress so that the fuel gas discharged from the reformer 2 contains a large amount of carbon monoxide. To solve this problem, this embodiment is designed such that, at a start of the power generating operation of the fuel cell system 100, the controller 101 controls the three-way valve 8 so as to connect the first route R1 to the second route R2 and the shutoff valve 7b is brought into a closed state so that the first, second and third routes R1, R2, R3 constitute the first fuel gas passage A, until the temperature of the reforming catalyst in the reforming section of the reformer 2 reaches a specified value so that fuel gas of good quality can be generated (that is, until a predetermined operating condition is met). Then, the first fuel gas passage A is supplied with the fuel gas which has been generated in the reformer 2 and contains high concentrations of carbon monoxide. Thereby, the fuel gas containing high concentrations of carbon monoxide is fed to the combustion burner 2a through the first fuel gas passage A. Then, the combustion burner 2a combusts the supplied fuel gas containing high concentrations of carbon monoxide, thereby heating the reforming catalyst in the reforming section of the reformer 2. The reforming catalyst is then heated to a specified temperature. The fuel gas, which has been combusted by the combustion burner 2a, is discharged as an exhaust combustion gas outwardly from the fuel cell system 100.

At that time, the combustion fan 2b supplies air to the combustion burner 2a for combustion of the fuel gas containing high concentrations of carbon monoxide in the combustion burner 2a. The feed rate of air supplied to the combustion burner 2a by the combustion fan 2b is properly set according to the amount of the raw material such as natural gas supplied from the raw material feeder to the reformer 2.

More concretely, hydrogen is theoretically generated, in the reformer 2, from natural gas through the chemical reaction represented by the formula (1) after starting the power generating operation of the fuel cell system 100. Where the feed rate of natural gas supplied from the material feeder to the reformer 2 is Q (L/min.), the discharge rate of hydrogen discharged from the reformer 2 according to the chemical reaction represented by the formula (1) is 4 Q (L/min.). In this embodiment, in order to completely combust hydrogen which is discharged from the reformer 2 and then fed to the combustion burner 2a through the first fuel gas passage A at a rate of 4 Q (L/min.), oxygen is fed from the combustion fan 2b to the combustion burner 2a at a rate of 2 Q (L/min.), thereby promoting the combustion reaction represented by the formula (2). At that time, the controller 101 controls the rotational speed of the combustion fan 2b so as to make the feed rate of oxygen supplied to the combustion burner 2a be 2 Q (L/min.).

$$CH_4 + 2H_2O \rightarrow CO_2 + 4H_2 \quad (1)$$

$$4H_2 + 2O_2 \rightarrow 4H_2O \quad (2)$$

In this embodiment, the feed rate of air supplied to the combustion burner 2a by the combustion fan 2b is set based on the amount of hydrogen theoretically generated by the reformer 2, that is, the feed rate of natural gas supplied from the raw material feeder to the reforming section of the reformer 2. Thereby, the fuel gas containing high concentrations of carbon monoxide is combusted in the combustion burner 2a, and then, the reforming catalyst in the reforming section of the reformer 2 is heated by the heat generated in the combustion burner 2a.

To more concretely describe the invention, the subsequent operation will be described in detail with reference to FIG. 4.

Figure 4:
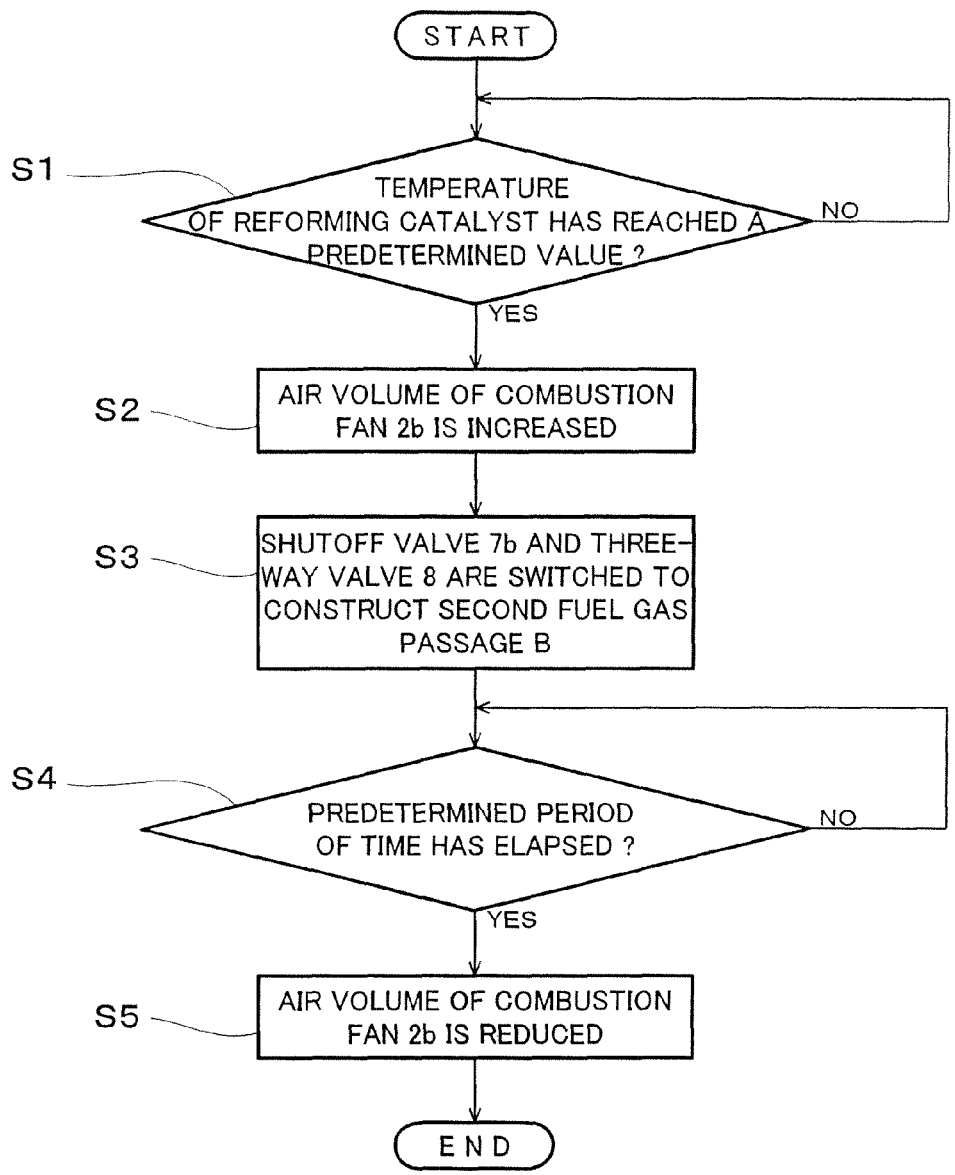
FIG. 4 is a flow chart of a part of the operation of the fuel cell system according to the first embodiment of the invention.

FIG. 4 is a flow chart of a part of the operation of the fuel cell system 1 according to the first embodiment of the invention.

As shown in FIG. 4, after the temperature of the reforming catalyst in the reforming section of the reformer 2 rises owing to the heat generated by the combustion of the fuel gas containing high concentrations of carbon monoxide in the combustion burner 2a, the controller 101 determines whether or not the temperature of the reforming catalyst has reached a specified value suited for the steam reforming reaction (Step S1). Herein, the temperature of the reforming catalyst is detected, for example, by a temperature sensor embedded in the reforming catalyst. The temperature sensor outputs a signal which is in turn input to the controller 101. Then, the temperature of the reforming catalyst is recognized by analyzing the output signal in the controller 101. If it is determined that the temperature of the reforming catalyst has not reached the specified value yet (NO in Step S1), the heating of the reforming catalyst by the combustion burner 2a continues until it is determined that the temperature of the reforming catalyst has reached the specified value.

If the controller 101 determines in Step S1 that the temperature of the reforming catalyst has reached the specified value (YES in Step S1), the controller 101 controls the air volume of the combustion fan 2b so as to increase (Step S2).

More concretely, the feed rate of the natural gas discharged from the fuel gas flow path 1a etc. of the fuel cell 1 after Step S3 (described later) and supplied to the combustion burner 2a is approximately equal to the feed rate of the fuel gas supplied from the reformer 2 to the fuel gas flow path 1a. According to the above formula (1), where the feed rate of the natural gas fed to the reformer 2 is Q (L/min.) for example, the reformer 2 discharges carbon dioxide in an amount of Q (L/min.) and hydrogen in an amount of 4 Q (L/min.). Therefore, the natural gas is fed to the combustion burner 2a from the fuel gas flow path 1a etc. of the fuel cell 1 at a rate of 5 Q (L/min.).

For completely combusting the natural gas supplied at a rate of 5 Q(L/min.) to convert the natural gas into carbon dioxide and water by the formula (3) as described, oxygen needs to be supplied to the combustion burner 2a at a rate of 10 Q (L/min.). However, as stated earlier, the feed rate of oxygen supplied to the combustion burner 2a at a start of the power generating operation of the fuel cell system 100 is 2 Q (L/min.) according to the feed rate of the natural gas supplied to the reformer 2. Therefore, imperfect combustion of the supplied natural gas proceeds in the combustion burner 2a. Owing to this imperfect combustion, carbon monoxide is discharged from the fuel cell system 100.

$$5CH_4 + 10O_2 \rightarrow 5CO_2 + 10H_2O \quad (3)$$

In order to completely combust the natural gas discharged from the fuel gas flow path 1a etc. of the fuel cell 1 and supplied to the combustion burner 2a, this embodiment is designed such that the feed rate of air supplied from the combustion fan 2b to the combustion burner 2a is increased as Step S2 before Step S3 in which the second fuel gas passage B is established by controlling the shutoff valve 7b and the three-way valve 8. Herein, the increased feed rate of air supplied from the combustion fan 2b to the combustion burner 2a is about 5 times in this embodiment based on the formula (3). Thereby, the feed rate of oxygen supplied from the combustion fan 2b to the combustion burner 2a becomes 10 Q (L/min.), so that the natural gas supplied at a rate of 5 Q (L/min.) is substantially perfectly combusted in the combustion burner 2a and, in consequence, the emissions of carbon monoxide to the outside of the fuel cell system 100 can be restrained.

The feed rate of air supplied from the combustion fan 2b to the combustion burner 2a may be increased in any increasing pattern.

Figure 3A:
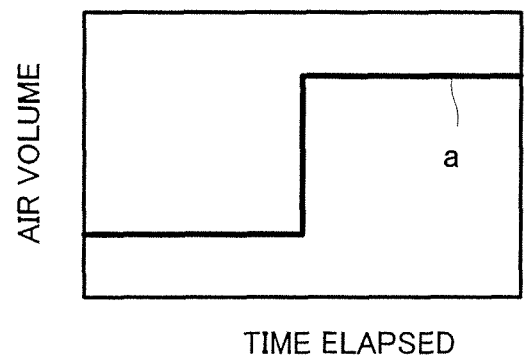
FIG. 3(a) shows a case where the feed rate of air is increased at a time.
Figure 3B:
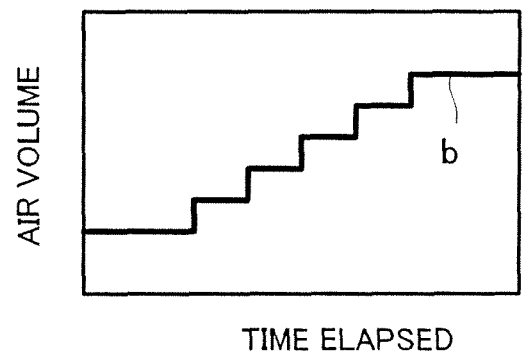
FIG. 3(b) shows a case where the feed rate of air is stepwise increased.
Figure 3C:
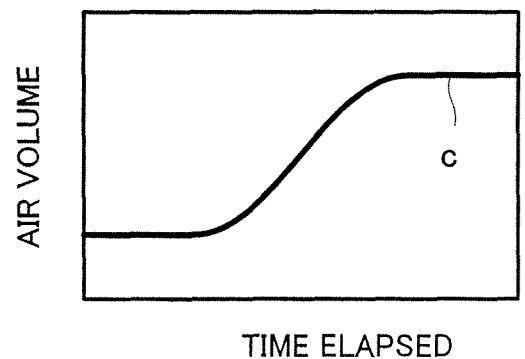
FIG. 3(c) shows a case where the feed rate of air is gradually increased.

FIG. 3 is pattern diagrams diagrammatically showing changes in the feed rate of air supplied from the combustion fan 2b to the combustion burner 2a. In FIGS. 3 (a) to 3 (C), the air volume of the combustion fan 2b is plotted on the ordinate whereas the time elapsed is plotted on the abscissa.

As shown in FIG. 3, in Step S2, the feed rate of air from the combustion fan 2b to the combustion burner 2a may be increased by a single step as indicated by curve a of FIG. 3 (a) or stepwise increased as indicated by curve b of FIG. 3 (b). Alternatively, it may be gradually increased as indicated by curve c of FIG. 3 (c). The imperfect combustion of natural gas in the combustion burner 2a can be effectively restrained by any of the increasing patterns of FIGS. 3 (a) to 3 (c).

After the air volume of the combustion fan 2b is increased in Step S2, the controller 101 controls the three-way valve 8 and the shutoff valve 7b, thereby establishing the second fuel gas passage B with the first route R1, the fourth route R4, the fuel gas flow path 1a, the fifth route R5 and the third route R3 (Step S3). Since the temperature of the reforming catalyst of the reforming section has reached, at that time, a specified value that enables the steam reforming reaction to proceed properly, the fuel gas containing a sufficiently reduced amount of carbon monoxide is discharged from the reformer 2. Then, the fuel gas generated in the reformer 2 and having a sufficiently reduced amount of carbon monoxide is supplied to the fuel gas flow path 1a of the fuel cell 1 through the first and fourth routes R1, R4. The fuel gas is supplied from the reformer 2 to the fuel gas flow path 1a etc. of the fuel cell 1, whereby the natural gas previously injected into the fuel gas flow path 1a and its neighboring part in the fuel cell 1 is forced out. The natural gas is fed to the combustion burner 2a through the fifth and third routes R5, R3.

In the combustion burner 2a, the natural gas forced out from the fuel gas flow path 1a etc. of the fuel cell 1 is combusted using air supplied from the combustion fan 2b. At that time, oxygen is supplied by the combustion fan 2b in the amount required for perfectly combusting natural gas as described earlier and therefore natural gas is perfectly combusted in the combustion burner 2a. Thereby, the emissions of carbon monoxide to the outside of the fuel cell system 100 can be restrained.

After the feed rate of air supplied from the combustion fan 2b to the combustion burner 2a has been increased, the whole volume of natural gas is discharged from the fuel gas flow path 1a etc. of the fuel cell 1, and if the timer section of the controller 101 determines that the specified time required for combusting the whole volume of natural gas in the combustion burner 2a has elapsed (Yes in Step S4), the feed rate of air supplied from the combustion fan 2b to the combustion burner 2a is reduced (Step S5). For example, the controller 101 controls the rotational speed of the combustion fan 2b so as to change the feed rate (10 Q (L/min.)) of oxygen supplied from the combustion fan 2b to the combustion burner 2a back to the air feed rate (2 Q (L/min.)) before increasing. In Step S5 and afterward, the combustion burner 2a combusts off gas discharged from the fuel gas flow path 1a etc. of the fuel cell 1. Thereby, the temperature of the reforming catalyst in the reforming section of the reformer 2 is maintained at the specified value that enables the steam reforming reaction to proceed.

After the fuel gas is supplied from the reformer 2 to the fuel cell 1, the fuel cell 1 starts the power generating operation as follows in Step S3 and afterward.

That is, after the fuel gas having a sufficiently reduced concentration of carbon monoxide is supplied from the reformer 2 to the fuel gas flow path 1a of the fuel cell 1 and air is supplied from the blower 3 to the oxidizing gas flow path 1b of the fuel cell 1, power generation is performed in the fuel cell 1 to output a specified amount of electric power, using the fuel gas and air supplied to the anode side and cathode side of the fuel cell 1. Off gas which has not been used for the power generation is discharged from the fuel gas flow path 1a of the fuel cell 1 and then supplied to the combustion burner 2a through the fifth and third routes R5, R3. Then, the off gas is combusted in the combustion burner 2a to promote the steam reforming reaction. The air discharged from the oxidizing gas flow path 1b of the fuel cell 1 is discharged to the outside of the fuel cell system 100.

During the power generating operation, the fuel cell 1 generates heat owing to the electrochemical reaction for the power generation. The heat generated in the fuel cell 1 is continuously recovered by the cooling water that is circulated by the pump 6a within the cooling water flow path (not shown in FIG. 1) provided in the fuel cell 1. The heat, which has been recovered by the cooling water circulated by the pump 6a, is utilized in the heat exchanger 4, for heating the water circulated from the hot water tank 5 by the pump 6b.

Although the first embodiment has been discussed with a case where the fuel gas flow path 1a of the fuel cell 1 and its neighboring part are filled with natural gas beforehand, the invention is not necessarily limited to this but equally applicable to other cases. For instance, the fuel gas flow path 1a etc. of the fuel cell 1 may be filled with hydrocarbon gas such as LPG beforehand. Thus, the invention is characterized in that the feed rate of oxygen supplied from the combustion fan 2b to the combustion burner 2a is increased for a specified period of time according to the kinds of hydrocarbon gas filling the inside of the fuel cell 1.

Although the first embodiment has been discussed with a case where the feed rate of air supplied from the combustion fan 2b to the combustion burner 2a is increased before establishing the second fuel gas passage B, the invention is not necessarily limited to this but equally applicable to cases where after establishing the second fuel gas passage B, the feed rate of air supplied from the combustion fan 2b to the combustion burner 2a is increased. With this arrangement, the same effects as of the first embodiment can be obtained. However, in this case, the feed rate of air supplied from the combustion fan 2b to the combustion burner 2a has to be increased before the natural gas forced out from the fuel cell 1 etc. is supplied to the combustion burner 2a through the fifth and third routes R5, R3.

Although the first embodiment has been discussed with a case where the temperature of the reforming catalyst is detected in Step S1 of FIG. 4, the invention is not necessarily limited to this but equally applicable to cases where the operating temperature of any of the reforming section, metamorphosing section and depurating section that constitute the reformer 2 is detected. With this arrangement, the same effects as of the first embodiment can be obtained.

Although the first embodiment has been discussed in terms of the fuel cell system 100 that has a solid polymer electrolyte fuel cell as the fuel cell 1, the invention is not necessarily limited to this but equally applicable to, for instance, cases where the fuel cell system 100 has a phosphoric-acid fuel cell or an alkaline fuel cell as the fuel cell 1. With this arrangement, the same effects as of the first embodiment can be obtained.

(Second Embodiment)

Figure 2:
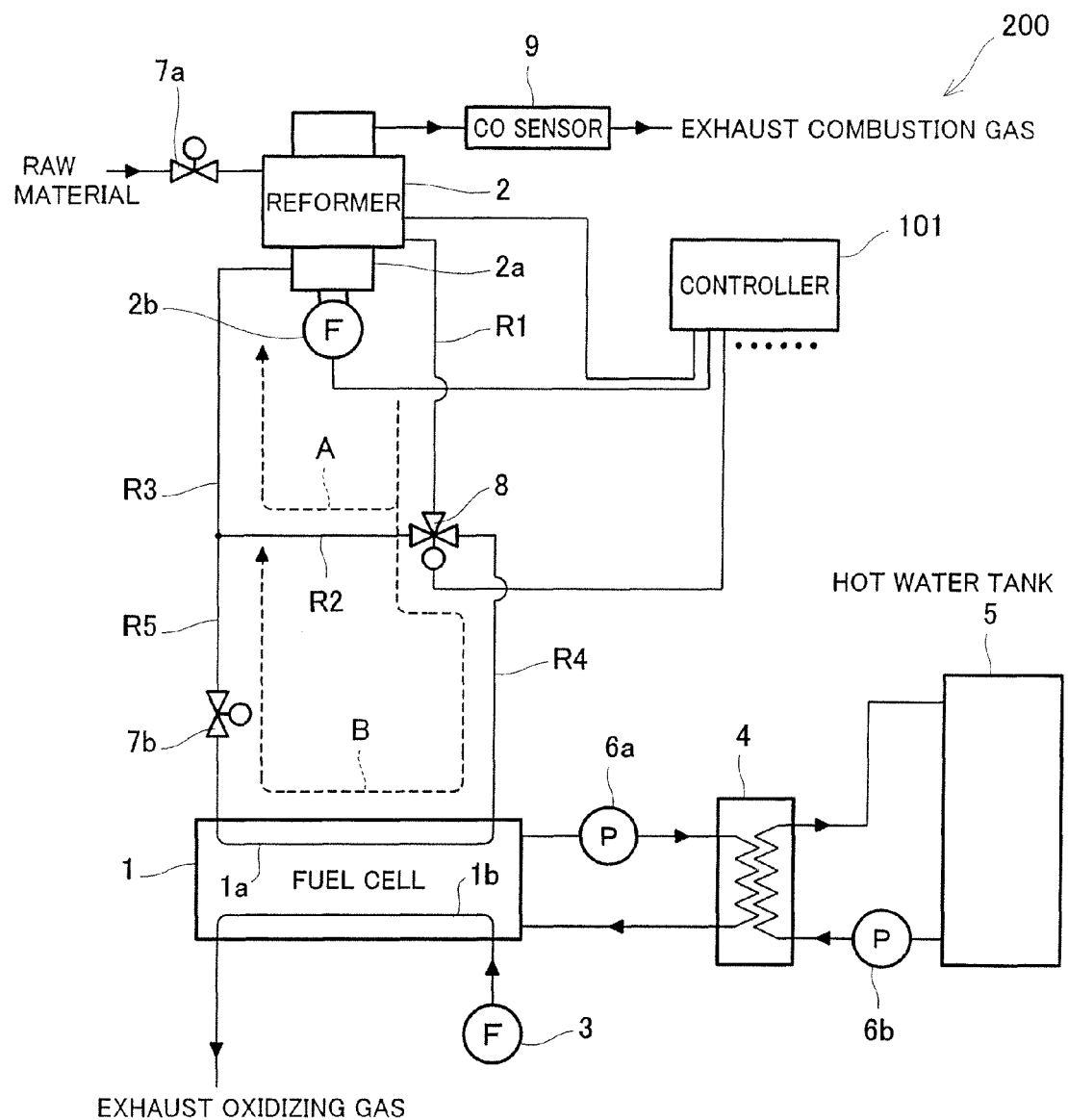
FIG. 2 is a block diagram diagrammatically showing the structure of a fuel cell system according to a second embodiment of the invention.

FIG. 2 is a block diagram diagrammatically showing the structure of a fuel cell system according to a second embodiment of the invention. In FIG. 2, solid lines connecting the elements of the fuel cell system indicate the flow paths for water, fuel gas, oxidizing gas etc. The arrows of the solid lines indicate the flowing directions of water, fuel gas, oxidizing gas etc. during normal operation. In FIG. 2, only the elements necessary for explaining the invention are shown and an illustration of other elements is omitted. In FIG. 2, the elements thereof corresponding to those of the fuel cell system 100 of the first embodiment are identified by the same reference numerals.

As shown in FIG. 2, the fuel cell system 200 of the second embodiment has a structure substantially similar to that of the fuel cell system 100 described in the first embodiment. However, the former differs from the latter in that the structure of the fuel cell system 200 of the second embodiment has a CO sensor 9. Except this, the structure of the fuel cell system 200 is the same as of the fuel cell 100 of the first embodiment.

As just stated above, the fuel cell system 200 of the second embodiment has the CO sensor 9. The CO sensor 9 outputs, to the controller 101, a change in the carbon monoxide concentration of the exhaust combustion gas discharged from the combustion burner 2a as a change in electric signal. The controller 101 recognizes a change, for instance, in the carbon monoxide concentration of the exhaust combustion gas by analyzing electric signals output from the CO sensor 9. In the second embodiment, the air volume of the combustion fan 2b is reduced if the controller 101 determines that the carbon monoxide concentration of the exhaust combustion gas discharged from the combustion burner 2a drops to a value equal to or less than "a predetermined threshold concentration", instead of determining an elapse of "the specified period of time" as described in Step S4 of FIG. 4. This will be more concretely described below. When the natural gas in the fuel gas flow path 1a of the fuel cell 1 and its neighboring part is combusted in the combustion burner 2a, a slight amount of carbon monoxide is sometimes generated because of imperfect combustion, whereas carbon dioxide and water are generated as chief products as shown in the formula (3). Therefore, the second embodiment is designed such that the air volume of the combustion fan 2b is reduced in Step S5 of FIG. 4 if the carbon monoxide concentration of the exhaust combustion gas detected by the CO sensor 9 drops, for instance, from 100 ppm to 30 ppm (this value is the threshold concentration) or less. With this arrangement, after the concentration of carbon monoxide contained in the discharged combustion gas drops to the predetermined threshold concentration or less and it is determined that the combustion of the natural gas serving as the displacement gas has been completed, the air volume of the combustion fan 2b can be reduced.

In the fuel cell system 200 of the second embodiment, if the CO sensor 9 outputs, to the controller 101, a change in the carbon monoxide concentration of the exhaust combustion gas discharged from the combustion burner 2a, as a change in electric signal, the controller 101 recognizes the output value (e.g., voltage value) of the electric signal from the CO sensor 9. And, if the controller 101 determines, instead of determining an elapse of "the specified period of time" as described in Step S4 of FIG. 4, that the output value of the CO sensor 9 indicative of the carbon monoxide concentration of the exhaust combustion gas discharged from the combustion burner 2a has dropped to "the predetermined output value" or less, the air volume of the combustion fan 2b is reduced. This does not require the controller 101 to calculate the carbon monoxide concentration of the exhaust combustion gas discharged from the combustion burner 2a, so that the program prestored in the memory of the controller 101 can be simplified.

Except the above point, the second embodiment does not differ from the first embodiment.

According to the invention, since the feed rate of oxygen supplied to the combustion burner 2a is increased when combusting the natural gas serving as the displacement gas by the combustion burner 2a, the amount of carbon monoxide generated during the combustion of the natural gas can be restrained. This makes it possible to provide an environmentally friendly fuel cell system that can effectively restrain the emissions of carbon monoxide at a start of power generating operation with a simple structure and therefore reduces adverse effects upon ecosystems.

Although the criterion of the determination as to whether or not the air volume of the combustion fan 2b should be reduced is "a specified period of time" in the first embodiment and is "a predetermined threshold concentration" or "a predetermined output value" in the second embodiment, it is not necessary to select either of the criteria but both of them may be applied. That is, an alternative arrangement is such that if the controller 101 recognizes an elapse of a predetermined period of time and the concentration of carbon monoxide detected by the CO sensor 9 drops to a predetermined threshold concentration or less (or the output value of the CO sensor 9 drops to a predetermined output value or less) in Step S4 (FIG. 4), the program proceeds to Step S5 (FIG. 4). With this arrangement, the same effects as of the first and second embodiments can be obtained.

INDUSTRIAL APPLICABILITY

The fuel cell systems according to the foregoing embodiments of the invention can be used for a wide range of industrial applications as environmentally friendly fuel cell systems that can effectively restrain the emissions of carbon monoxide at a start of power generating operation with a simple structure and therefore reduce adverse effects upon ecosystems.

The invention claimed is:

1. A method of operating a fuel cell system, the method is performed between two sequential stop operations, the method comprising steps of:
performing combustion by using a hydrogen-containing fuel gas supplied from a fuel gas generator to a combustor through a bypass passage and air supplied from an air feeder to the combustor, the fuel gas generator generating the hydrogen-containing fuel gas by reforming a raw material gas through a reforming reaction, the bypass passage connecting a fuel gas passage, through which the hydrogen-containing fuel gas from the fuel gas generator is supplied to a fuel cell, to an off gas passage through which a redundant fuel gas from the fuel cell is supplied to the combustor;
switching destination of the hydrogen-containing fuel gas generated in the fuel generator from the bypass passage to the fuel cell during performing the combustion;
filling the fuel cell with the raw material gas before the switching;
performing combustion by using the raw material gas supplied from the fuel cell to the combustor after the switching; and
increasing a feed rate of air supplied from the air feeder to the combustor, before switching the destination, such that the feed rate of air supplied from the air feeder to the combustor immediately after the switching becomes higher than the feed rate of air supplied from the air feeder to the combustor before the switching.

2. The method of operating the fuel cell system according to claim 1, wherein the raw material gas is hydrocarbon gas.

3. The method of operating the fuel cell system according to claim 1, wherein the raw material gas is supplied from a raw material feeder to the fuel cell during a stop operation or start-up operation before the step of performing combustion, thereby filling the fuel cell with the raw material gas.

4. The method of operating the fuel cell system according to claim 1, further comprising:
reducing the feed rate of air supplied from the air feeder to the combustor to the feed rate of air before the step of increasing after an elapse of a predetermined period of time after the step of increasing, and continuing supplying air from the air feeder to the combustor at the feed rate of air before the step of increasing.

5. The method of operating the fuel cell system according to claim 1, further comprising:
detecting carbon monoxide contained in exhaust gas discharged from the combustor by using a CO detector; and
reducing the feed rate of air supplied from the air feeder to the combustor if an output value of the CO detector drops to a predetermined value or less or alternatively, the concentration of carbon monoxide obtained based on the output value of the CO detector drops to a predetermined concentration or less after the increasing.

6. The method of operating the fuel cell system according to claim 1, wherein the feed rate of air supplied from the air feeder to the combustor is increased in a single step.

7. The method of operating the fuel cell system according to claim 1, wherein the feed rate of air supplied from the air feeder to the combustor is increased in multiple steps.

8. The method of operating the fuel cell system according to claim 1, wherein the feed rate of air supplied from the air feeder to the combustor is increased in a continuous manner.

9. The method of operating the fuel cell system according to claim 1, further comprising a step of detecting temperature of the reformer,
wherein, when it is detected that the temperature of the reformer has reached a predetermined temperature, the feed rate of air supplied from the air feeder to the combustor is increased in the step of increasing.

10. The method of operating the fuel cell system according to claim 1, further comprising:
heating the fuel gas generator by using heat generated by the combustion until the fuel gas generator becomes ready to supply the hydrogen-containing fuel gas to the fuel cell,
wherein the destination of the hydrogen-containing fuel gas is switched from the bypass passage to the fuel cell after the fuel gas generator has become ready to supply the hydrogen-containing fuel gas to the fuel cell.

11. The method of operating the fuel cell system according to claim 1, wherein the fuel cell system includes a fuel cell and an air feeder that is provided separately from the air feeder for the combustor and supplies an air to the fuel cell.

12. The method of operating the fuel cell system according to claim 1, wherein the feed rate of air supplied from the air feeder to the combustor is increased immediately before switching the destination.

* * * * *